United States Patent
Cohen et al.

(10) Patent No.: US 9,253,617 B2
(45) Date of Patent: Feb. 2, 2016

(54) METHODS AND SYSTEMS FOR CARRIER ACTIVATION USING INFORMATION FROM AN EXISTING PROFILE

(71) Applicant: Google Inc., Mountain View, CA (US)

(72) Inventors: Gabriel Cohen, Alameda, CA (US); Sara Anne Barton Sinclair, Mountain View, CA (US); Dave Burke, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 14/041,802

(22) Filed: Sep. 30, 2013

(65) Prior Publication Data

US 2015/0094022 A1 Apr. 2, 2015

(51) Int. Cl.
*H04W 4/24* (2009.01)
*H04W 8/18* (2009.01)

(52) U.S. Cl.
CPC . *H04W 4/24* (2013.01); *H04W 8/18* (2013.01)

(58) Field of Classification Search
CPC ..... H04W 4/001; H04W 12/06; H04W 40/24; H04W 40/001; H04W 4/246; H04W 40/248; H04W 4/24; H04W 8/20; H04W 4/003; H04W 8/183; H04W 8/18; H04W 4/26; H04W 52/28; H04W 8/265; H04W 8/24; H04W 12/00; H04W 12/08; H04W 76/02; H04W 76/021; H04W 8/22; H04W 8/245; H04W 88/00; H04W 88/02; H04W 88/18; H04W 92/00; G06F 9/445; G06F 9/4865
USPC ........... 455/410–411, 418–420, 432.1, 432.3, 455/434, 435.1–435.3, 517, 524–525, 455/550.1, 551, 552.1, 556.2, 557–558, 455/560–561
See application file for complete search history.

(56) References Cited

U.S. PATENT DOCUMENTS

| | | | |
|---|---|---|---|
| 7,353,017 B2 * | 4/2008 | Chen et al. | 455/414.2 |
| 7,359,516 B1 * | 4/2008 | Skinner et al. | 380/270 |
| 8,107,953 B2 * | 1/2012 | Zimmerman et al. | 455/433 |
| 2002/0136199 A1 * | 9/2002 | Hartmaier | 370/352 |
| 2003/0050062 A1 * | 3/2003 | Chen et al. | 455/435 |
| 2007/0124062 A1 * | 5/2007 | Janky et al. | 701/207 |
| 2007/0197228 A1 * | 8/2007 | McGary et al. | 455/445 |
| 2007/0206736 A1 * | 9/2007 | Sprigg et al. | 379/88.21 |
| 2010/0157850 A1 | 6/2010 | Horn et al. | |
| 2010/0167696 A1 * | 7/2010 | Smith et al. | 455/411 |

(Continued)

FOREIGN PATENT DOCUMENTS

| | | |
|---|---|---|
| EP | 0929966 | 12/2005 |
| WO | WO 2012/097044 | 7/2012 |

*Primary Examiner* — Meless Zewdu
(74) *Attorney, Agent, or Firm* — McDonnell Boehnen Hulbert & Berghoff LLP

(57) ABSTRACT

A platform included in a device can be configured to execute instructions to operate the device. The platform can be configured to setup connectivity to a network provided by a data service provider by having an activated account with the data service provider. To activate the account, the platform can be configured to determine that subscription information requested by the data service provider is included in an existing profile associated with the device. Responsive to the determination the subscription information is included in the profile, the platform can be configured to provide information from the profile as the subscription information to activate the account with the data service provider and receive subscriber-level connectivity to the network.

15 Claims, 7 Drawing Sheets

(56) References Cited

U.S. PATENT DOCUMENTS

| | | | |
|---|---|---|---|
| 2010/0178899 A1* | 7/2010 | Toy et al. | 455/411 |
| 2010/0311444 A1* | 12/2010 | Shi et al. | 455/466 |
| 2011/0306318 A1* | 12/2011 | Rodgers et al. | 455/410 |
| 2012/0089845 A1* | 4/2012 | Raleigh | 713/176 |
| 2012/0157047 A1* | 6/2012 | Chen et al. | 455/411 |
| 2012/0218902 A1 | 8/2012 | Kirtley et al. | |
| 2012/0233629 A1 | 9/2012 | Swildens | |
| 2013/0183934 A1* | 7/2013 | Roemer et al. | 455/411 |

* cited by examiner

METHODS AND SYSTEMS FOR CARRIER ACTIVATION USING INFORMATION FROM AN EXISTING PROFILE

BACKGROUND

Unless otherwise indicated herein, the materials described in this section are not prior art to the claims in this application and are not admitted to be prior art by inclusion in this section.

A mobile device such as a phone or tablet can be configured to access a carrier's data network. For example, the device can be configured to allow access to the carrier's website to purchase or add data service to the device, but otherwise prevent access to the Internet. For example, a warm SIM (subscriber identity module) can be provided by the carrier and included with the device with instructions to allow the device to utilize the carrier's network only to access the carrier's billing website. When the user of the device is directed to the carrier's website, the user may provide subscription information (e.g., identity and/or payment information) to the carrier to activate an account and receive data connectivity through the carrier's network.

SUMMARY

In one example, a method is provided that comprises determining, by a platform configured to operate a device, a profile associated with the device. The method further comprises determining a data service provider based on configuration instructions included in a memory accessible by the platform. The device may be configured to communicate via a network provided by the data service provider based on the device being associated with an activated account with the data service provider. The activation of the account with the data service provider authorizes the device to receive subscriber-level connectivity to the network. The method further comprises receiving, by the platform, a request from the data service provider for subscription information to activate the account associated with the device. The method further comprises determining that the subscription information requested by the data service provider is included in the determined profile associated with the device. Responsive to determining that the subscription information is included in the profile, the method further comprises providing information from the profile to the data service provider as the subscription information. The method further comprises receiving the subscriber-level connectivity to the network based on the device being associated with the activated account with the data service provider.

In another example, a device is provided that comprises a network communication interface configured to provide connectivity to a network provided by a data service provider based on the device being associated with an activated account with the data service provider. Activation of the account with the data service provider authorizes the device to receive subscriber-level connectivity to the network. The device further comprises an input interface configured to receive input pertaining to a profile associated with the device. The device further comprises one or more processors and data storage configured to store instructions executable by the one or more processors. The instructions cause the device to determine the data service provider based on configuration instructions included in the data storage, receive a request from the data service provider for subscription information to activate to the account, determine that the subscription information is included in the determined profile, responsive to the determination that the subscription information is included in the profile provide information from the profile to the data service provider as the subscription information, and receive via the network communication interface the subscriber-level connectivity to the network based on the device being associated with the activated account with the data service provider.

In another example, a computer readable medium is provided. The computer readable medium can have instructions stored therein that when executed by a computing device cause the computing device to perform functions. The functions comprise determining, by a platform configured to operate the computing device, a profile associated with the computing device. The functions further comprise determining a data service provider based on configuration instructions included in a memory accessible by the platform. The computing device may be configured to communicate via a network provided by the data service provider based on the computing device being associated with an activated account with the data service provider. The activation of the account with the data service provider authorizes the computing device to receive subscriber-level connectivity to the network. The functions further comprise receiving, by the platform, a request from the data service provider for subscription information to activate the account associated with the computing device. The functions further comprise determining that the subscription information requested by the data service provider is included in the determined profile associated with the computing device. Responsive to determining that the subscription information is included in the profile, the functions further comprise providing information from the profile to the data service provider as the subscription information. The functions further comprise receiving the subscriber-level connectivity to the network based on the computing device being associated with the activated account with the data service provider.

These as well as other aspects, advantages, and alternatives, will become apparent to those of ordinary skill in the art by reading the following detailed description, with reference where appropriate to the accompanying figures.

DETAILED DESCRIPTION

Figure 1:
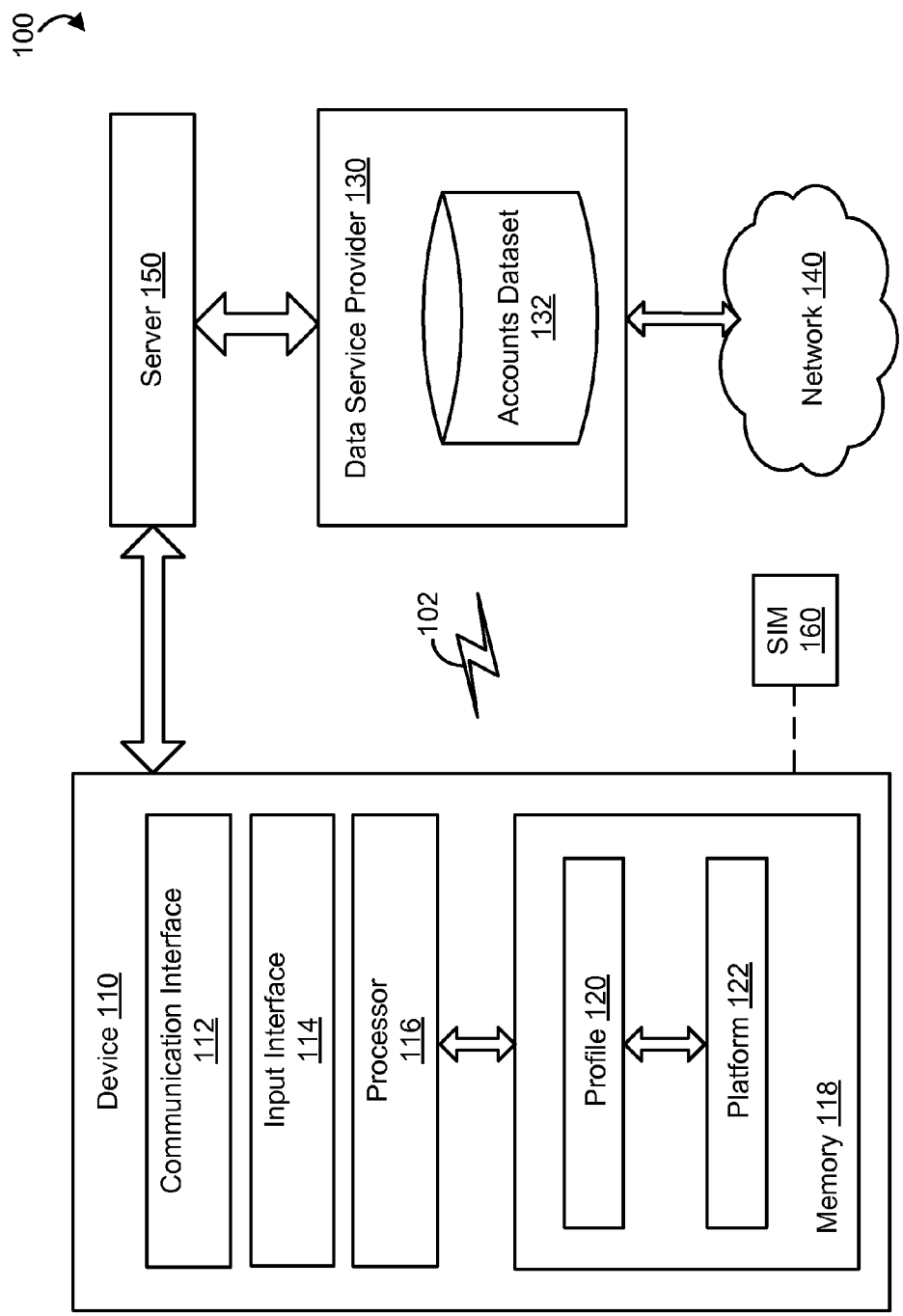
FIG. 1 is a block diagram of an example system including a device configured to receive access to a network via a data service provider.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Some mobile devices such as smartphones and tablets collect profile information from the user of the device. For example, during setup of the device, the device may collect information such as username, password, first name, last name, form of payment, and/or billing address, for inclusion into the profile. In another example, the collected information may be added to the profile during setup of an online service such as an online application store or an email account by the user of the device. In some cases, the profile that includes the collected information may include subscription information that a carrier requires to authorize access to the carrier's network. However, the user of the device may be required to enter this information during setup of the device via the device's native platform, and again during setup of the carrier data service via the carrier's web platform.

An electronic device can include a native platform configured to execute instructions from one or more applications to operate the electronic device. The electronic device can be configured to receive connectivity to a network via a data service provider based on the electronic device having an activated account with the data service provider. In examples where the electronic device does not have the activated account, the data service provider may request subscription information from the device to activate the account or to create a new activated account for the device. Within examples described herein, a device is provided that includes a native platform configured to operate the device and to provide the subscription information to the data service provider from information included in a profile associated with the device. The device can be, for example, a digital camera, computing device, wearable device, mobile device, cellular phone, tablet, etc. Thus, for example, a user of the device can activate the account without entering the information in the profile again for submission to the data service provider. Additionally to entering the information only once, in some examples, the user will not be required to interact with an application or website other than the native platform of the device for provision of the subscription information. In other examples, the native platform of the device may automatically populate the user interface of the data service provider (e.g., billing website) with the information in the profile as the subscription information required by the data service provider to authorize access to the carrier's network.

In some examples, the data service provider may request the device to obtain a configuration package of the data service provider (e.g., carrier-specific service provider application). For example, the configuration package may include operating instructions (e.g., communication protocol, encoding instructions, etc.) for the platform to communicate over the data service provider's network. Thus, the device may obtain the configuration package from various locations. In one example, the configuration package may be obtained from a memory included in the device (e.g., internal flash memory, etc.) or a memory removably mounted to the device (e.g., Subscriber Identity Module (SIM) card, USB drive, etc.). In another example, the configuration package may be obtained via the network provided by the data service provider. For example, the data service provider may authorize the device to access a server that includes the configuration package. In yet another example, the configuration package may be obtained via an alternative network other than the network provided by the data service provider, such as a Wifi network or a Local Area Network (LAN) that the device has access to. For example, the device may be a tablet that can access multiple networks including the network of the data service provider and a second network (e.g., Wifi Internet connection). In this example, the device may search for the configuration package, for example, in the internet accessible via the second network to obtain the configuration package.

FIG. 1 is a block diagram of an example system 100 including a device 110 configured to receive access to a network 140 via a data service provider 130. The device 110 can be configured to communicate with the data service provider 130 via a communication signal 102. The communication signal 102 can be, for example, a wireless or wired signal. For example, the device 110 may comprise a cellular phone and the communication signal 102 may comprise a wireless signal between the smartphone and the data service provider 130 (e.g., cellular service carrier). Alternatively, in some examples, the device 110 may comprise a personal computer and the communication signal 102 may comprise a wired signal over an Ethernet port. The system 100 can optionally include a server 150 in communication with the device 110 and/or the data service provider 130. The system 100 can optionally include a subscriber identity module (SIM) 160 configured to be removably mounted to the device 110.

The device 110 includes a communication interface 112 configured to provide the device 110 with connectivity to one or more networks. The device 110 also includes an input interface 114, such as a keyboard, mouse, buttons, touch-screen display, etc. The device 110 also includes a processor 116 and a memory 118 comprising instructions executable, via a platform 122, by the processor 116 to operate the device 110. The memory 118 can include the platform 122 and a profile 120.

The device 110 may comprise a computing device such as a cellular phone, smartphone, digital assistant, digital electronic device, digital camera, body-mounted computing device (e.g., eye-glasses with computing capability), tablet device, or any other computing device configured to receive connectivity to one or more networks via the communication interface 112. Although not illustrated in FIG. 1, the device 110 can include additional components, such as a display, a camera, an input port (e.g., Universal Serial Bus port), or any other physical component configured, based on instructions from the platform 122 executable by the processor 116, to operate the device 110.

The communication interface 112 can be configured to provide the connectivity between the device 110 and one or more networks. For example, the communication interface 112 can include circuitry coupled with one or more antennae to communicate wirelessly over a wireless medium (e.g., Bluetooth, Wifi, Broadband, etc.) or circuitry coupled with a communication port to communicate over a wired medium (e.g., Ethernet, etc.). The communication interface 112 can be configured to receive instructions and/or information for transmission to/from remote devices and/or systems. For example, the communication interface 112 can be configured to receive instructions from the platform 122 to communicate information via the communication signal 102 with the data service provider 130. Additionally or alternatively, in some examples, the communication interface 112 can be configured to receive requests and/or information from the remote devices and/or systems (e.g., from data service provider 130).

The input interface 114 can be configured to receive input for the device 110 for processing by the processor 116 based on instructions provided by the platform 122. The input interface 114 can include, for example, circuitry coupled to one or more keyboards, buttons, microphones, touchpads, touch-screen displays, or any other component configured to provide input to the device 110. Although illustrated in FIG. 1 that the input interface 114 is included in the device 110, in some examples, the input interface 114 can be an external component. For example, the input interface 114 can be a wireless keyboard configured to provide signals via the communication interface 112 (e.g., via Bluetooth) that correspond to input for the device 110.

The processor 116 included in the device 110 may comprise one or more processors configured to execute instructions from the platform 122 to operate the device 110. The memory 118 can include one or more memories (e.g., flash memory, Random Access Memory (RAM), solid state drive, disk drive, etc.) that include software components configured to provide instructions pertaining to operation of the device 110. In some examples, the memory 118 can include a data storage memory configured to store data pertaining to the device 110 such as the profile 120. Additionally or alternatively, in some examples, the memory 118 can include a program logic memory (e.g., RAM) that includes the platform 122. Additionally or alternatively, the memory 118 may comprise a module that can be removably mounted to the device 110 (e.g., SIM 160, USB Drive, etc.). In some examples, the memory 118 can be one physical component configured to store data and/or application components described above. In other examples, the memory 118 can be more than one physical component configured to store data and/or application components described above. Additionally, the memory 118 can include more software components than illustrated in FIG. 1. For example, the memory 118 can include one or more applications (e.g., email application, phonebook application, etc.) configured to provide operating instructions to the platform 122 to operate the device 110. In another example, the memory 118 can include one or more application programming interfaces (APIs) configured to interface between the platform 122 and the communication interface 112, the server 150, and/or the data service provider 130.

The profile 120 includes information associated with the device 110 and/or a user of the device 110. For example, the profile 120 can include identity information (e.g., first name, last name, home address, username, password, etc.) and/or payment information (e.g., credit card number, bank account number, billing address, etc.). In some examples, the information in the profile 120 can be obtained during setup of the device 110. For example, the device 110 can be configured to receive input via the input interface 114 corresponding to the information in the profile 120 when the user of the device 110 sets up the device 110 for the first time and/or resets the device 110. In another example, the user of the device 110 can input the information in the profile 120 at a time other than during setup of the device 110, such as when there is a change in the information (e.g., new credit card number, new address, etc.) or any other time. In yet another example, the user of the device 110 can input the information in the profile 120 during setup of an online service such as an online store or an email account. In some examples, the device 110 can be configured to store the profile 120 including the received information from the input interface 114 in the memory 118.

The platform 122 executes operating instructions to operate, via the processor 116, the device 110. In some examples, the platform 122 can be a native platform (e.g., platforms that operate smartphones, tablets, etc.) accessible by other software components included in the memory 118 and configured to execute instructions pertaining to operation of the device 110. For example, the platform 122 can execute instructions to receive input from the input interface 114 and include the received input in the profile 120, or display output to a display panel (not shown in FIG. 1). Additionally or alternatively, in some examples, the platform 122 can be an operating system of the device 110. In some examples, the platform 122 can be configured to determine the profile 120. For example, the platform 122 can be configured to receive the stored profile 120 from the memory 118 as described above. In some examples, the platform 122 can be configured to create and/or obtain the profile 120 based on input received via the input interface 114.

In some examples, the device 110 can be configured to communicate via the communication signal 102 with the data service provider 130 to receive subscriber-level connectivity to the network 140. For example, the subscriber-level connectivity may include authorized access for communication with other devices over the network. In some examples, the data service provider 130 may provide limited connectivity (e.g., only to a billing website of the data service provider 130) until receiving subscription information from the device 110, and then provide subscriber-level connectivity after receiving the subscription information and activating an account for the device 110. The data service provider 130 may comprise a communication system external to the device 110. For example, the data service provider 130 may comprise a cellular network carrier. Although not illustrated in FIG. 1, in some examples, the data service provider 130 can include a gateway configured to control subscriber-level connectivity by the device 110 to the network 140. The data service provider 130 can control aspects (e.g., service type) of the connectivity between the device 110 and the network 140 such as maximum bit rate of data connectivity or voice call quality of voice connectivity.

To facilitate providing the subscriber-level connectivity at the service type (e.g., service level), the data service provider 130 can include an accounts dataset 132 with information pertaining to an account of the device 110 and/or other accounts of other devices. The accounts data set 132 may comprise, for example, a database that includes information about the account of the device 110 and/or other devices that are configured to receive subscriber-level connectivity to the network 140 via the data service provider 130. In some examples, the account dataset 132 can include more than one database. For example, the account dataset 132 can have a first database with information pertaining to the account of device 110 and a second data base with information pertaining to an account of another device. In some examples, the accounts dataset 132 can be included in one or more physical memories. For example, the accounts dataset 132 can be on one server or on multiple servers (e.g., cloud of servers). In this example, the data service provider 130 can be configured to obtain information in the account of the device 110 from the accounts dataset 132.

The account of the device 110 in the accounts dataset 132 can include various information such as status of the account (e.g., activated, deactivated, etc.), service type associated with the account (e.g., maximum bit rate of data connection, amount of data available to device 110, etc.), and/or other user information (e.g., user name, etc.). By having the account with the data service provider 130, the device 110 can receive access to the network 140 at the authorized service type when the account is activated.

The network 140 may comprise a transport network (e.g., internet, local area network, wide area network, cellular network, broadband network, etc.) that the device 110 can be configured to communicate through. In some examples, the network 140 may comprise a public switched telephone network (PSTN), a packet-switched network (e.g., internet), or any other network that provides subscriber-level connectivity between the device 110 and one or more electronic devices connected to the network 140.

The system 100 can optionally include the server 150. The server 150 may comprise a remote server (e.g., computing device, cloud computing system, etc.) accessible to the device 110. In some examples the server 150 can be accessible to the device 110 via a network other than the network 140. For example, the server 150 can be accessible over a WIFI network (not shown in FIG. 1) where the network 140 can be a cellular network that does not include the WIFI network. In other examples, the server 150 can be accessible via the network 140.

The system 100 can optionally include the SIM 160 configured to be removably mounted to the device 110. In some examples, the SIM 160 can be configured to include information similar to the memory 118. For example, the SIM 160 may include the profile 120, the configuration instructions corresponding to the data service provider 130, and/or other information accessible to the device 110 (e.g., applications, saved data, etc.) when the SIM 160 is mounted to the device 110.

In some examples, the server 150 can be configured to store information for the device 110. Although illustrated that the profile 120 is stored in the memory 118, additionally or alternatively, in some examples, the profile 120 can be stored on the server 150. For example, the platform 122 can be configured to obtain the profile 120 from the server 150 based on authentication information input via the input interface 114. For example, a user of the device 110 may enter the authentication information (e.g., username and password), and the platform 122 can provide the authentication information to the server 150 to receive the profile 120.

The system 100, for example, may provide a native experience for a user of the device 110 to obtain subscriber-level connectivity to the network 140 via the data service provider 130. The native experience can be provided, for example, by allowing the user to interact with the platform 122, and configure the platform 122 to perform all communication and provision of information to the data service provider 130 to authorize access to the network 140 and/or activate the account of the device 110 with the data service provider 130. As described above, the data service provider 130 may request the device 110 to have the activated account with the data service provider 130 to receive the subscriber-level connectivity to the network 140. For example, the data service provider 130 may allow limited connectivity (e.g., only for communication regarding submission of subscription information) until activating the account. In some examples, the data service provider 130 may request subscription information to activate the account associated with the device 110. For example, the device 110 may not have the account with the data service provider 130 or the account of the device 110 may be deactivated (e.g., for non-payment). In this example, provision of the subscription information may cause the data service provider to create the account for the device 110 and/or activate the account. In some examples, the platform 122 can determine that the subscription information is included in the profile 120. Thus, in these examples, the platform 122 can be configured to provide information from the profile 120 as the subscription information to the data service provider 130 to receive the subscriber-level connectivity to the network 140. In this case, the user will not need to input the information repetitively, once for the profile 120 and another time for the data service provider 130. Additionally, in this case, the user will only input the information via the native platform 120 and not through another interface (e.g., webpage provided by the data service provider 130). In an example where the data service provider 130 provides another interface (e.g., billing webpage), the platform 122 can be configured to automatically populate the interface provided by the data service provider 130 with the information from the profile 120.

Below is an example scenario for the operation of the platform 122 in the device 110 to receive the subscriber-level connectivity to the network 140 from the data service provider 130. In this scenario, the device 110 may comprise a wireless device such as a smartphone or tablet, and the data service provider 130 may comprise a carrier such as a wireless cellular carrier.

In this scenario, the platform 122 can be configured to determine the profile 120. For example, the profile 120 can be created based on input during setup of the device 110 or by receiving the profile 120 from the server 150 as described above. In some examples, obtaining the profile from the server 150 can happen during activation of the account with the data service provider 130.

In this scenario, the platform 122 can also be configured to determine the data service provider 130 based on configuration instructions in the memory 118. In some examples, the configuration instructions identifying the data service provider 130 as a provider accessible to the device 110 can be included in the SIM 160. In this example, the SIM 160 may comprise a warm SIM that provides information allowing the device 110 to access the carrier website via the network 140 (e.g., access the data service provider 130 billing webpage). In other examples, the configuration instructions can be in the memory 118 comprising physical memory in the device 110 (e.g., RAM, etc.) as described above in the description of the memory 118.

In some examples, the platform 122 can be configured to attempt to receive subscriber-level connectivity to the network 140 via the data service provider 130 via the communication signal 102. For example, the data service provider 130 may provide limited connectivity to the device 110 for provision of subscription information to activate the account, and provide the subscriber-level connectivity once the account is activated. In some examples, the data service provider 130 may authorize the subscriber-level connectivity to the network 140 if the device 110 has the activated account with the data service provider 130. However, in this scenario, the data service provider 130 may respond with a request for subscription information from the device 110 to activate the account. For example, the device 110 may be a new device that does not have an account with the data service provider 130 or the account may be deactivated (e.g., for non-payment).

Rather than direct the user of the device 110 to a website of the carrier (e.g., as instructed by the configuration instructions in the warm SIM 160), in the system 100, the platform 122 can be configured, for example, to determine that the subscription information requested by the data service provider 130 is included in the determined profile 120 associated with the device 110. Thus, in some examples, the platform 122 can be configured to provide information from the profile 120 as the subscription information to the data service provider 130. In this scenario, the data service provider 130 may activate the account of the device 110 due to the provision of the subscription information, and thus, the device 110 may receive the subscriber-level connectivity to the network 140.

In some examples, the platform 122 can be configured to provide the subscription information to the data service provider 130 after receiving authorization input from the user of the device 110. For example, the data service provider 130 may request sensitive information such as payment information and/or identity information, and the platform 122 may request the authorization input from the user of the device 110 to authorize the provision of the sensitive information to the data service provider 130.

In some examples where the profile 120 is included in the server 150 (not shown in FIG. 1), the platform 122 can be configured to provide instructions to the server 150 that cause the server 150 to provide the subscription information to the data service provider 130. For example, the server 150, when instructed by the platform 122, may communicate directly with the data service provider 130 and provide the subscription information based on information from the profile 120.

In some examples, the device 110 can be configured to receive, via the input interface 114, selection input indicative of a selected service type pertaining to the network 140. For example, the selection input may correspond to a maximum bit rate of data connectivity, bandwidth selection, amount of data, quality of voice calls, etc. In these examples, the platform 122 can be configured to provide the selected service type along with the information from the profile 120 as the subscription information to the data service provider 130. Thus, in these examples, the data service provider 130 may provide the subscriber-level connectivity to the network 140 having the selected service type.

In some examples, the data service provider 130 may request the platform 122 to obtain a configuration package of the data service provider 130. For example, in this scenario, the request may include a name of a carrier software package or application ("configuration package") that includes operating instructions for the platform 122 to communicate over the network 140 provided by the carrier. The operating instructions, for example, may include a communication protocol (e.g., FTP, UTP, custom protocol, encryption protocol, packet format, etc.) specific for communication between the platform 122 and the data service provider 130. In these examples, the platform 122 can be configured to obtain the configuration package based on receiving the request. In some examples, the configuration package can be included in the memory 118 (e.g., physical memory of phone, the SIM 160 when mounted to the device 110, etc.). Thus, in these examples, the device 110 can be configured to obtain the configuration package from the memory 118. In other examples, the platform 122 can be configured to obtain the configuration package via the network 140. For example, the data service provider can allow the device 110 to access a server (such as server 150) or other data storage medium accessible via the network 140 to obtain the configuration package. In yet other examples, the device 110 can be configured to have access to a second network (e.g., WIFI network, Bluetooth network, Local Area Network, etc.) other than the network 140 and configured to obtain the configuration package via the second network.

Some embodiments of the system 100 therefore provide the native experience to the user of the device 110 by performing communication with the data service provider 130 without invoking an interface of the data service provider (e.g., web page, etc.). In some examples, future communication (e.g., after activating account) between the device 110 and the data service provider 130 can be performed via the native interface of the platform 122. For example, the platform 122 can be configured to provide reminders to the user of the device 110 when a payment is due or provide an interface for the user of the device 110 to update and/or adjust the service type of the account with the data service provider 130.

It is noted that the block diagram shown in FIG. 1 is described in connection with functional modules for convenience in description. For example, while the functional block in FIG. 1 shown as the profile 120 can be included in the memory 118, the profile 120 does not necessarily need to be implemented as being physically present on the memory 118 but can be present in another memory included in the device 110, included in a second device (not shown in FIG. 1), or in the server 150. In some examples, embodiments of the device 110 can be arranged with one or more of the functional modules ("subsystems") implemented in a single chip, integrated circuit, and/or physical component.

Figure 2:
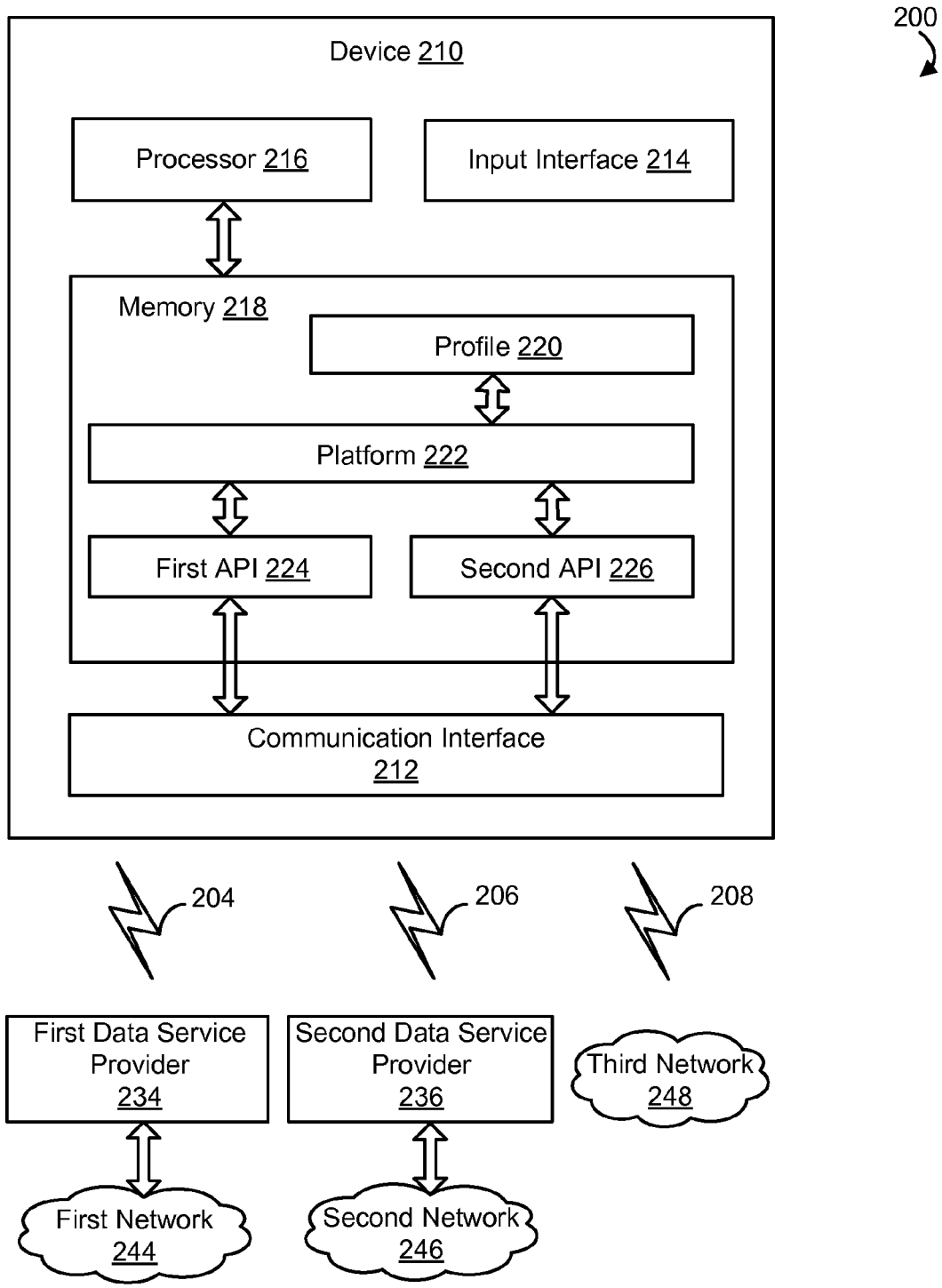
FIG. 2 is a block diagram of an example system including a device configured to receive access to one or more networks via one or more data service providers.

FIG. 2 is a block diagram of an example system 200 including a device 210 configured to receive access to one or more networks via one or more data service providers. Device 210 included in the system 200 can be similar to the device 110 described in system 100. For example, the device 210 may comprise a communication interface 212, an input interface 214, a processor 216, and a memory 218 similar to, respectively, the communication interface 112, input interface 114, processor 116, and memory 118 described in the system 100. Similarly, the platform 222 can be configured to execute instructions via the processor 216 to operate the device 210 similarly to the platform 122 in the system 100.

In some examples, the device 210 can be configured to receive connectivity to one or more networks, such as a first network 244, a second network 246, and/or a third network 248 via, respectively, communication signals 204-208. The communication signals 204-208 can be similar to the communication signal 102 described in the system 100 (e.g., wireless, wired, etc.). The first network 244 and the second network 246 can be similar to the network 140 described in the system 200. For example, connectivity to the first network 244 and/or the second network 246 can be controlled, respectively, by first data service provider 234 and/or second data service provider 236. In some examples, the function and operation of the first data service provider 234 and the second data service provider 236 can be similar to the function and operation of the data service provider 130 described in the system 100. For example, the first data service provider 234 may provide limited connectivity to the device 210 for submission of information to activate an account, and then provide subscriber-level connectivity when the account is activated. The third network 248 can be a network accessible by the device 210 without a data service provider, such as a WIFI network, local area network (LAN), wide area network (WAN), or any other network accessible via the communication interface 212.

The memory 218 can include, for example, a profile 220 and a platform 222 similar, respectively, to the profile 120 and the platform 122 described in the system 100. However, in some examples, the platform 222 can be configured to communicate via a first application programming interface (API) 224 and/or a second API 226 through the communication interface 212 to interact, respectively, with the first data service provider 234 and/or the second data service provider 236.

In some examples, the first API 224 may comprise an application separate from the platform 222 configured to interface through the communication interface 212 with the first data service provider 234. For example, the first API 224 may comprise a back-end API that receives instructions and information from the platform 222 or any other application and facilitates the communication of the instructions and information to the first data service provider 234. Similarly, the second API 226 can be configured to facilitate communication with the second data service provider 236. Thus, in some examples, the first API 224 and the second API 226 may comprise separate applications configured to relay communication from the platform 222 (or any other application), respectively, to the first data service provider 234 and the second data service provider 236.

As noted above, the device 210 can be configured to receive connectivity to one or more networks via one or more data service providers. In some examples, the memory 218 includes configuration instructions corresponding to a plurality of data service providers. For example, the device 210 may detect that the first data service provider 234 and the second data service provider 236 are available data service providers for the device 210 to receive connectivity, respectively, to the first network 244 and/or the second network 246. In an example where the device 210 is a mobile device (e.g., mobile phone, tablet, etc.) and the first and second data service providers 234-236 are cellular network providers, in some examples, the device 210 can be configured to receive a selection input of one of the data service providers 234-236 to attempt receiving subscriber-level connectivity from. In this example, a user of the device 210 may select one of the first data service provider 234 or the second data service provider 236 to receive data connectivity from (e.g., the device 210 may comprise an "unlocked" mobile device). In these examples, the device 210 can be configured to determine the data service provider to communicate through based on the input selection.

Similarly to the device 110 of the system 100, in some examples, the device 210 can be configured to obtain a configuration package of the first data service provider 234 and/or the second data service provider 236 based on a request from the corresponding data service provider. In some examples, the configuration package may include operating instructions for the platform 222 to communicate with the corresponding data service provider (e.g., carrier/platform specific software package). Additionally or alternatively, in some examples, the device 210 can be provided with the first API 224 and/or the second API 226 that include the operating instructions included in the configuration package. For example, during manufacture and/or setup of the device 210, the device 210 may be provided with one or more APIs (e.g., first API 224 and second API 226) that include the operating instructions for a plurality of data service providers (e.g., first data service provider 234 and second data service provider 236). Thus, in this example, a user of the device 210 can interact with the native platform 222 to provide information such as information in the profile 220 and select one or more of the first and second data service providers 234-236 to receive connectivity from. Further, in some examples, the backend adapters (e.g., first and second APIs 224-226) can be configured to perform communication with the corresponding data service providers for functions such as provision of subscription information from information in the profile 220 and activation of an account as described in the system 100, based on the selections of the user. Thus, in some examples, the first and second APIs 224-226 provide an alternative mechanism for provision of subscription information and account management with data service providers in addition to mechanisms described earlier, such as via server 150 and/or platform 122 of the system 100. Further, in some examples, the platform 222 can be configured to provide information from the profile 220 and instructions to the first and/or second APIs 224-226 to perform the provision of subscription information and/or activation of the account. In this case, the first and/or second APIs 224-226 can be configured to communicate, respectively, with the first and/or second data service providers 234-236 based on the instructions and information received from the platform 222.

In examples where the configuration package is obtained based on a request from the first and/or second data service providers 234-236, the third network 248 can be utilized via the communication interface 212 to obtain the configuration package. For example, the third network 248 may comprise an internet connection to a server that includes the configuration package of one or more of the data service providers 234-236. In this example, the platform 222 can be configured to receive the configuration package from the server via the third network 248. Further, in this case, the provision of subscription information to activate the account and receiving subscriber-level connectivity to the first and/or second networks 244-246 may be performed, for example, by the platform 222 based on the configuration package received via the third network 248. For example, the third network 248 may comprise a WIFI network that the platform 222 utilizes to receive the configuration package of the first data service provider 234 to setup subscriber-level connectivity to the first network 244 (e.g., broadband network) provided by the first data service provider 234.

Additionally or alternatively, although not illustrated in FIG. 2, in some examples, a plurality of configuration packages can be included in the memory 218 corresponding to a plurality of data service providers, such as the first and second data service providers 234-236. In these examples, the platform 222 can be configured to determine a particular configuration package of the plurality of configuration packages corresponding to the data service provider selected by the user of the device 210. For example, the user of the device 210 may select the second data service provider 236, and the platform 222 can be configured to provide the particular configuration package from the memory 218 that corresponds to the second data service provider 236 as the configuration package of the second data service provider 236. Thus, these examples provide another alternative mechanism to obtain the configuration package, such as when a plurality of configuration packages is provided in the memory 218 during manufacture and/or setup of the device 218. In some examples, the plurality of configuration packages can be provided in a SIM removably mounted to the device 210 along with configuration instructions for the corresponding data service providers (e.g., list of data service providers 234-236 accessible by the device 210), and the platform 222 can be configured to obtain the corresponding configuration package from the SIM.

Some embodiments of the system 200 therefore provide methods for receiving subscriber-level connectivity to one or more networks via one or more data service providers while maintaining a native experience for the user of the device 210. For example, subscription information and account management can be performed by the native platform 222 (or a server similar to server 150 of the system 100) on behalf of the user of the device 210 using information from the profile 220 without re-entering such information in a data service provider specific interface (e.g., webpage, warm SIM provided interface, etc.). Additionally or alternatively, in some examples, the system 200 provides methods for obtaining configuration packages of the data service providers (e.g., carrier specific code for interaction with the data service providers 234-236) including receiving the configuration packages from memory 218, via the third network 248, and/or via the first and second networks 244-246 provided by the first and second data service providers 234-236. Additionally or alternatively, in some examples, the system 200 provides methods for communication with data service providers using separate APIs such as the first and second APIs 224-226.

Figure 3:
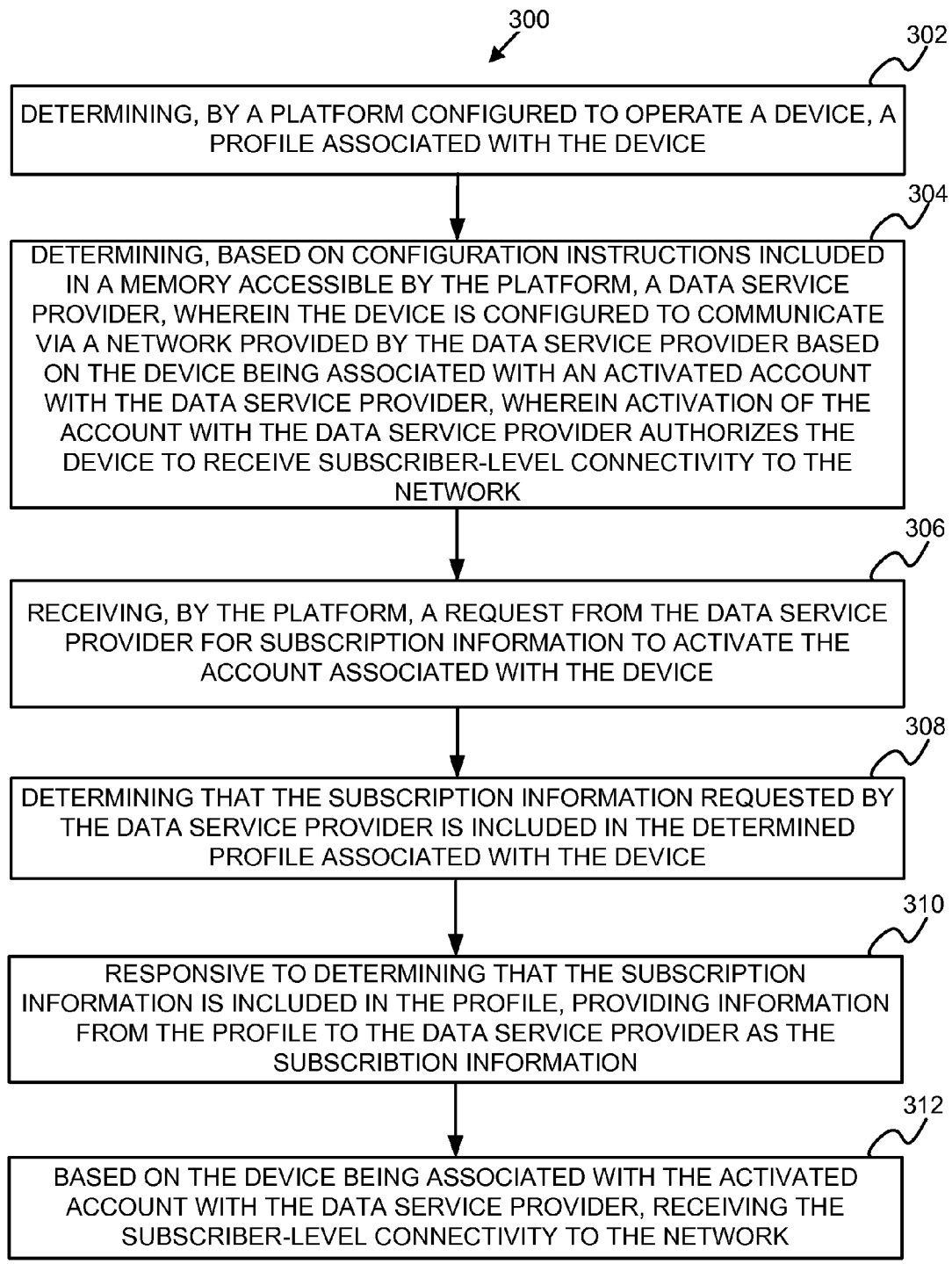
FIG. 3 is a block diagram of an example method for operating an example device to setup connectivity to a network provided by a data service provider, in accordance with at least some embodiments described herein.

FIG. 3 is a block diagram of an example method 300 for operating an example device to setup connectivity to a network provided by a data service provider, in accordance with at least some embodiments described herein. Method 300 shown in FIG. 3 presents an embodiment of a method that could be performed by the device 110 or the device 210 included, respectively, in the systems 100 or 200, for example. Method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or nonvolatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes determining a profile associated with a device by a platform configured to operate the device.

In one example, the device can be a smartphone configured to connect to a network of a given carrier (e.g., the data service provider). The device can have a profile stored thereon with information about a user of the device. For example, the user may have entered information in the past (e.g., personal information, payment information, etc.) via the platform for use in an application (e.g., email application, phonebook application, etc.). Further, the platform can be configured to store this information for later use in the profile (e.g., the platform configured to determine the profile).

At block 304, the method 300 includes determining a data service provider based on configuration instructions included in a memory accessible by the platform. The device can be configured to communicate via a network provided by the data service provider based on the device being associated with an activated account with the data service provider. Activation of the account with the data service provider authorizes the device to receive subscriber-level connectivity to the network.

In this example, the device can be configured to determine the data service provider (e.g., the given carrier) based on configuration instructions in a memory of the device (e.g., the device can include instructions provided by the carrier and/or manufacturer of the device to connect to the carrier's network). Additionally or alternatively, in some examples, the memory can include configuration instructions for receiving network connectivity through a plurality of carriers, and the user can select the data service provider from the plurality of carriers. In this example, the data service provider may provide subscriber-level connectivity to the network if the device has an activated account with the data service provider (e.g., the user is subscribed to a data plan or a voice plan with the carrier).

At block 306, the method 300 includes receiving a request from the data service provider by the platform for subscription information to activate the account associated with the device.

In this example, the platform can be configured to attempt to connect to the data service provider's network, and in response, receive a request from the data service provider for subscription information to activate the account associated with the device. For example, the user of the device may not have the account (e.g., data plan, voice plan, etc.) with the data service provider or the account may be deactivated (e.g., for non-payment, etc.).

At block 308, the method 300 includes determining that the subscription information requested by the data service provider is included in the determined profile associated with the device.

For example, the profile may include the payment information and/or the personal information described in block 302. Additionally or alternatively, in some examples, the platform can be configured to poll the user of the device to authorize the platform to provide the information in the profile to the data service provider.

At block 310, the method 300 includes providing information from the profile to the data service provider as the subscription information in response to determining that the subscription information is included in the profile.

For example, the platform can provide the subscription information over the network provided by the data service provider or provide instructions to a server (e.g., online store) to provide the information to the data service provider.

At block 312, the method 300 includes receiving the subscriber-level connectivity to the network based on the device being associated with the activated account with the data service provider.

For example, the data service provider may activate the account of the user of the device (e.g., activate the voice plan or data plan of the user) in response to receiving the subscription information, and thus, provide the subscriber-level connectivity to the network.

Figure 4:
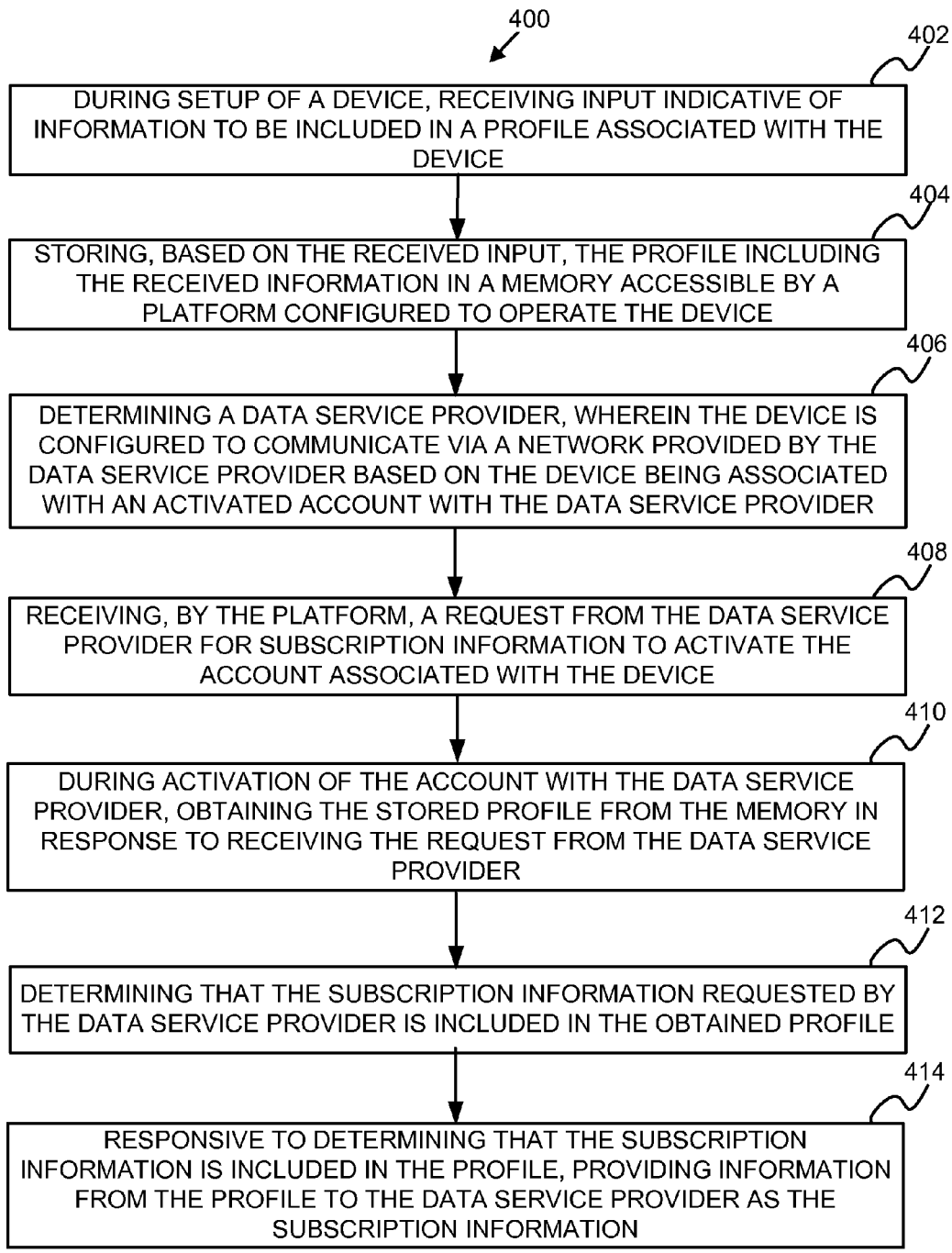
FIG. 4 is a block diagram of an example method for setup of an example device to determine a profile, and activation of an account with a data service provider using information from the determined profile to receive connectivity to a network provided by the data service provider, in accordance with at least some embodiments described herein.

FIG. 4 is a block diagram of an example method 400 for setup of an example device to determine a profile, and activation of an account with a data service provider using information from the determined profile to receive connectivity to a network provided by the data service provider, in accordance with at least some embodiments described herein. Method 400 shown in FIG. 4 presents an embodiment of a method that could be performed by the device 110 or the device 210 included, respectively, in the systems 100 or 200, for example. Method 400 may include one or more operations, functions, or actions as illustrated by one or more of blocks 402-414. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 402, the method 400 includes receiving input indicative of information to be included in a profile associated with a device during setup of the device.

In an example scenario for the method 400, a user acquires a tablet (e.g., "the device") that includes a platform configured to operate the tablet to execute applications (e.g., email application, camera application, etc.) and receive subscriber-level connectivity to one or more networks (e.g., packet-switched network, public-switched transport network, etc.). During setup of the device, the platform can be configured to receive input (e.g., the tablet can launch a setup wizard to collect the input) indicative of information to be included in a profile associated with the device. For example, the user of the tablet may setup an online store that allows the user to buy applications (e.g., bookstore application, etc.) for the device, and setting up an online store account may include providing information (e.g., credit card information, legal name, address, etc.) that, in some examples, may be included in the profile.

At block 404, the method 400 includes storing the profile including the received information in a memory accessible by a platform configured to operate the device based on the received input.

For example, the user of the device may instruct the platform to save the information collected during setup of the device in the profile for future use, or the platform may be configured to automatically save the information in the profile, for example, in the online store account. In some examples, the memory may comprise a physical memory included in the device (e.g., Random Access Memory, Flash Memory, etc.). In other examples, the memory may comprise a removably mounted memory (e.g., Subscriber Identity Module, USB Drive, etc.). In yet other examples, the memory may comprise a data storage (e.g., hard drive, solid state memory, etc.) in the device or in a remote server accessible by the device (e.g., via Internet connection).

At block 406, the method 400 includes determining a data service provider. The device can be configured to communicate via a network provided by the data service provider based on the device being associated with an activated account with the data service provider.

In some examples, the user of the device may have also acquired a warm Subscriber Identity module (SIM) that includes configuration instructions that identify a data service provider as an accessible provider for the device to receive subscriber-level connectivity to a network of the one or more networks (e.g., a broadband data network such as a 3G or 4G network, a voice calling network, etc.). A warm SIM can be, for example, a SIM that includes instructions for the data service provider to whitelist access to specific portions of the network even if the device does not have an activated account with the data service provider (e.g., by issuing a captive portal redirect from carrier pointing to carrier billing website). Rather than directing the user of the device to the specific portion (e.g., carrier billing website), in this example, the platform can be configured to determine the data service provider based on the configuration instructions.

At block 408, the method 400 includes receiving a request from the data service provider by the platform for subscription information to activate the account associated with the device.

In this example, the platform can be configured to attempt to access the network through the data service provider. For example, in this scenario, the tablet can attempt to connect to the internet via the network of the data service provider. Thus, in this example, the platform may receive a request from the data service provider for subscription information to activate the account of the device with the data service provider in order to receive the subscriber-level connectivity to the network. For example, in this scenario, the carrier may intercept the attempt from the tablet having an unpaid warm SIM, and issue the captive portal redirect to the carrier's billing website, and the platform can determine the request for the subscription information based on the captive portal redirect. Additionally or alternatively, in some examples, the carrier may include a software package name (e.g., "configuration package of the data service provider"), where the software package includes operating instructions for the platform to communicate over the network (e.g., communication protocol of the carrier, etc.). Thus, in some examples, the platform can be configured to determine the request and/or the configuration package by parsing the software package name from the request of the data service provider. Further, in these examples, the platform can be configured to obtain the configuration package of the data service provider. For example, in this scenario, the setup wizard of the tablet can optionally download the software package via the network of the data service provider, another network (e.g., WIFI network) accessible by the platform, or from the memory included in the device.

At block 410, the method 400 includes obtaining the stored profile from the memory during activation of the account with the data service provider in response to receiving the request from the data service provider.

For example, the platform may begin activation of the account with the data service provider due to receiving the request for subscription information from the data service provider, receiving input from the user of the device requesting activation of the account and installation of the configuration package, and/or based on the configuration instructions in the memory (e.g., instructions to activate the account at the conclusion of setup of the device). In these examples, the device can be further configured to obtain the stored profile from the memory to facilitate the activation of the account. For example, the user of the device may indicate to the platform to use information from the profile to complete the activation process, or the device may determine that information from the platform can be used to complete the activation process.

At block 412, the method 400 includes determining that the subscription information requested by the data service provider is included in the obtained profile.

For example, the platform may determine that payment information in the requested subscription information has been previously entered by the user of the device when setting up the online store in block 402.

At block 414, the method 400 includes providing information from the profile to the data service provider as the subscription information in response to determining that the subscription information is included in the profile.

For example, the platform can be configured to utilize public APIs to submit the information from the profile to the data service provider without having the user of the device repetitively enter the information that is in the profile. In some examples, the platform can be configured to provide the information from the profile to the data service provider after receiving authorization from the user of the device to provide the information. In some examples, the user may also select a service type to include in the subscription information provided to the data service provider. For example, the user of the tablet can select an amount of data to purchase from the data service provider, and the profile can be configured to provide the selected amount ("selected service type") along with the information from the profile as the subscription information to the data service provider.

Additionally, in some examples, the provision of the subscription information to the data service provider can cause the data service provider to activate the account of the device, and, thus, the device can receive the subscriber-level connectivity to the network.

Thus, the method 400 and other methods and systems presented in this disclosure, provide a native experience, via the platform of the device, to setup the activated account for subscriber-level connectivity to the network provided by the data service provider. Such native experience can include, for example, a single interface (e.g., the platform) for entering information once into the profile, and without the use of an interface provided by the data service provider provisioning subscription information and/or account management instructions to the data service provider by the platform using information from the existing profile.

Figure 5:
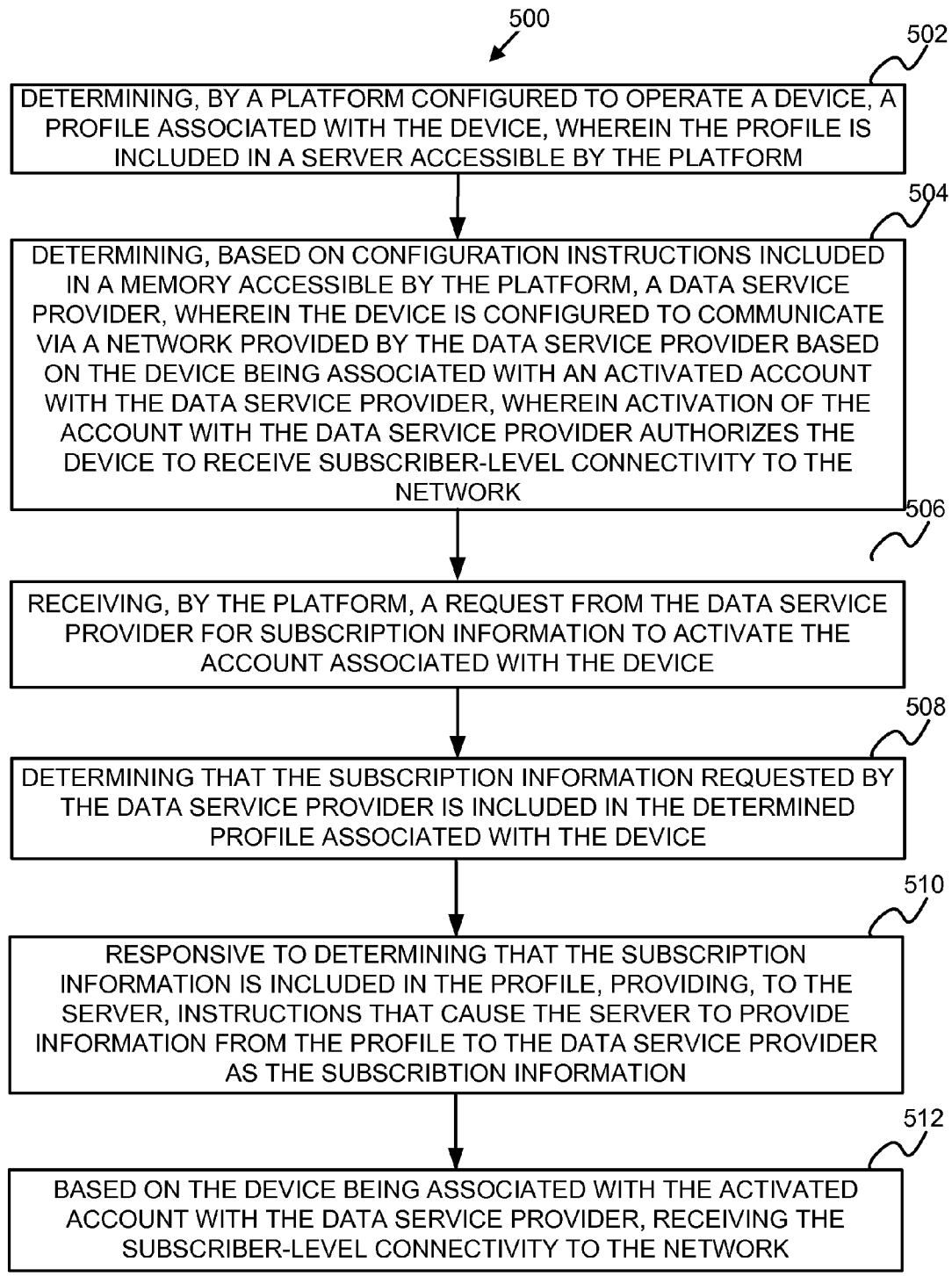
FIG. 5 is a block diagram of an example method for operating an example device to setup connectivity to a network provided by a data service provider by providing instructions to a server that cause the server to provide subscription information to the data service provider, in accordance with at least some embodiments described herein.

FIG. 5 is a block diagram of an example method 500 for operating an example device to setup connectivity to a network provided by a data service provider by providing instructions to a server that cause the server to provide subscription information to the data service provider, in accordance with at least some embodiments described herein. Method 500 shown in FIG. 5 presents an embodiment of a method that could be performed by the device 110 or the device 210 included, respectively, in the systems 100 or 200, for example. Method 500 may include one or more operations, functions, or actions as illustrated by one or more of blocks 502-512. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the method 500 includes determining a profile associated with a device by a platform configured to operate the device. The profile can be included in a server accessible by the platform.

For example, the user of a device (e.g., smartphone) can have a profile (e.g., account) with an online store in a remote server (e.g., accessible via internet) such as online stores used to buy and download applications that run on the smartphone. In this example, a platform configured to operate the device can also be configured, for example, to provide the server having the profile with authentication information to identify and obtain access to the profile associated with the device.

At block 504, the method 500 includes determining a data service provider based on configuration instructions included in a memory accessible by the platform. The device can be configured to communicate via a network provided by the data service provider based on the device being associated with an activated account with the data service provider. Activation of the account with the data service provider authorizes the device to receive subscriber-level connectivity to the network.

For example, the device can be configured to receive subscriber-level connectivity to a network provided by a data service provider (e.g., broadband data access in a cellular network) when the device has an activated account with the data service provider. For example, before having the activated account, the data service provider may allow the device limited connectivity only for submission of information to activate the account. In this example, the platform can be configured to determine the data service provider based on configuration instructions in the memory of the device (e.g., the memory can include a list of available data service providers).

At block 506, the method 500 includes receiving a request from the data service provider by the platform for subscription information to activate the account associated with the device.

For example, the user of the device may not have an established account with the data service provider, or the account may be deactivated.

At block 508, the method 500 includes determining that the subscription information requested by the data service provider is included in the determined profile associated with the device.

At block 510, the method 500 includes providing instructions to the server that cause the server to provide information from the profile to the data service provider as the subscription information in response to determining that the subscription information is included in the profile.

At block 512, the method 500 includes receiving the subscriber-level connectivity to the network based on the device being associated with the activated account with the data service provider.

For example, where the profile is in the server of the online store, the platform can be configured to provide information (e.g., username, password, payment amount, etc.) and instructions to the server to provide the information from the profile to the data service provider as the subscription information. Thus, in this example, the data service provider may activate the account of the device, and the device can be configured to receive subscriber-level connectivity to the network based on having the activated account.

Figure 6:
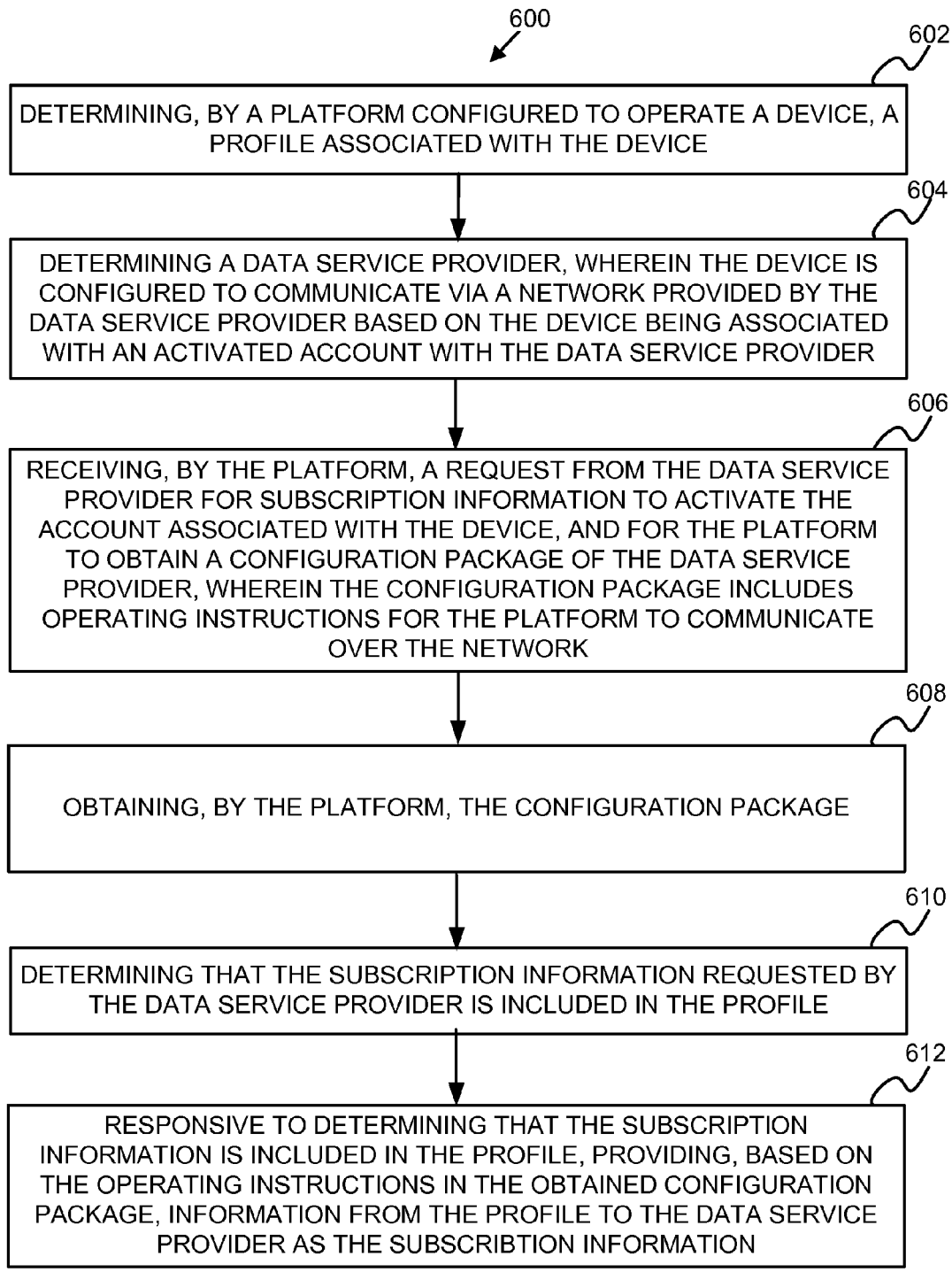
FIG. 6 is a block diagram of an example method for operating an example device to setup connectivity to a network provided by a data service provider and obtain a configuration package of the data service provider.

FIG. 6 is a block diagram of an example method 600 for operating an example device to setup connectivity to a network provided by a data service provider and obtain a configuration package of the data service provider, in accordance with at least some embodiments described herein. Method 600 shown in FIG. 6 presents an embodiment of a method that could be performed by the device 110 or the device 210 included, respectively, in the systems 100 or 200, for example. Method 600 may include one or more operations, functions, or actions as illustrated by one or more of blocks 602-612. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, the method 600 includes determining, by a platform configured to operate a device, a profile associated with the device.

For example, a device may comprise a personal digital assistant (PDA) that includes the profile with information about the user of the PDA (e.g., identity information, address, payment information, authentication information, etc.).

At block 604, the method 600 includes determining a data service provider, wherein the device is configured to communicate via a network provided by the data service provider based on the device being associated with an activated account with the data service provider.

For example, the data service provider may comprise a gateway in a public network configured to provide access to the network if the device has an activated account with the gateway.

At block 606, the method 600 includes receiving, by the platform, a request from the data service provider for subscription information to activate the account associated with the device, and for the platform to obtain a configuration package of the data service provider, wherein the configuration package includes operating instructions for the platform to communicate over the network.

For example, the gateway may have a software package that includes operating instructions for the device to communicate with the gateway and/or the network provided through the gateway.

At block 608, the method 600 includes obtaining, by the platform, the configuration package.

For example, the platform may obtain the configuration package from the gateway, from a network other than the network of the data service provider, from the memory of the device, or from a remote server accessible by the platform.

At block 610, the method 600 includes determining that the subscription information requested by the data service provider is included in the profile.

At block 612, the method 600 includes, responsive to determining that the subscription information is included in the profile, providing, based on the operating instructions in the obtained configuration package, information from the profile to the data service provider.

For example, the profile may include payment information requested by the gateway to create the activated account, or activate a deactivated account of the device. Responsive to the determination, in this example, the platform can further be configured to provide information from the profile (e.g., the payment information) based on the operating instructions in the configuration package, to the data service provider as the subscription information. For example, the operating instructions may instruct the platform to provide the subscription information using a specific communication protocol (e.g., FTP, UDP, etc.) and/or encryption code.

Figure 7:
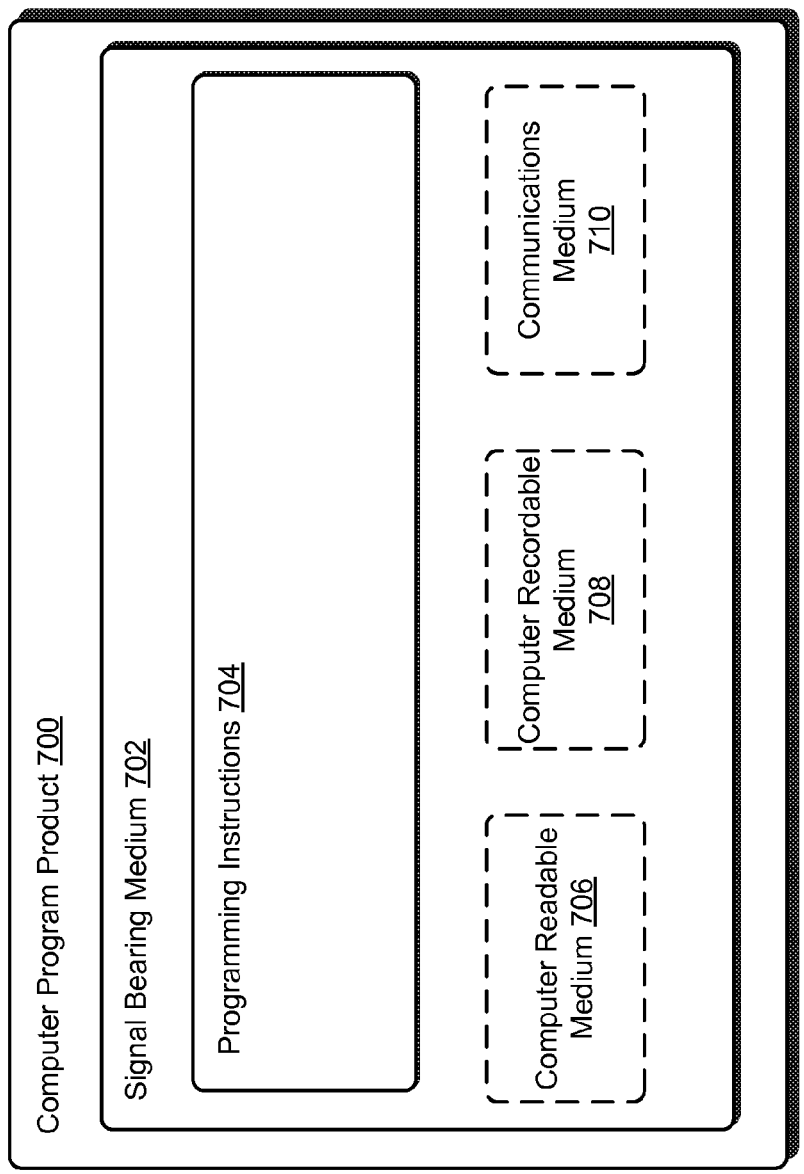
FIG. 7 depicts an example computer-readable medium configured according to at least some embodiments described herein.

FIG. 7 depicts an example computer-readable medium configured according to at least some embodiments described herein. In example embodiments, the example system can include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. methods 300, 400, 500, and 600) can be implemented by computer program instructions encoded on a computer readable storage media in a machine-readable format, or on other media or articles of manufacture (e.g., the instructions stored on the memory 118 of the device 110 of the system 100, or the instructions stored on the memory 218 of the device 210 of the system 200). FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 can be a computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communication medium 710 (e.g., a fiber optic cable, a waveguide, a wired communications link, a wireless communication link, etc.). Thus, for example, the signal bearing medium 702 can be conveyed by a wireless form of the communications medium 710.

The one or more programming instructions 704 can be, for example, computer executable and/or logic implemented instructions. In some examples, a computing device such as the processor-equipped devices 110 and 210 of FIGS. 1 and 2 can be configured to provide various operations, functions, or actions in response to the programming instructions 704 conveyed to the computing device by one or more of the computer readable medium 706, the computer recordable medium 708, and/or the communications medium 710. In other examples, the computing device can be an external device such as a server or personal computer in communication with a data service provider, such as the data service providers 130, 234, and/or 236 of FIGS. 1 and 2.

The computer readable medium 706 can also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server. For example, the computer program product 700 can implement the functionalities discussed in the description of FIGS. 1-6.

Within examples, operation methods that are described for the disclosed devices can be applied to other devices that are configured to receive subscriber-level connectivity to one or more networks provided by one or more data service providers. For example, medical devices, special purpose computers, digital cameras, home appliances, and computer automated vehicles can perform the functions described herein to receive subscriber-level connectivity to the one or more networks provided by the one or more data service providers. Thus, example methods herein provide a native platform for provision of subscription information and account management with any data service provider without a user having to repetitively enter information that is in an existing profile.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   during initial setup of an unactivated device, receiving, by a platform on the device configured to operate the device, from a server accessible by the device via a first network, a profile including identification information identifying a user of the device;
   determining, based on configuration instructions included in a memory accessible by the platform, a data service provider, wherein the device is configured to communicate via a second network provided by the data service provider based on the device being associated with an activated account with the data service provider, wherein activation of the account with the data service provider authorizes the device to receive subscriber-level connectivity to the second network;
   receiving, by the platform, a request from the data service provider for subscription information to activate the account with the data service provider, wherein the request is further for the platform to obtain a configuration package of the data service provider, and wherein the configuration package includes operating instructions for the platform to communicate over the second network;
   determining that the subscription information requested by the data service provider is included in the profile received during the initial setup of the device;
   obtaining, by the platform, via the first network, the configuration package;
   responsive to determining that the subscription information is included in the profile received during the initial setup of the device, providing information from the profile to the data service provider as the subscription information based on the operating instructions in the obtained configuration package; and
   based on the device being associated with the activated account with the data service provider, receiving the subscriber-level connectivity to the second network.

2. The method of claim 1, wherein the memory includes configuration instructions corresponding to a plurality of data service providers, wherein determining the data service provider comprises:
   receiving input indicative of a selection of a given data service provider of the plurality of data service providers; and
   determining the data service provider to be the given data service provider.

3. The method of claim 1, further comprising:
   receiving input indicative of authentication information relating to the profile;
   providing the authentication information to the server; and
   receiving the profile included in the server associated with the authentication information.

4. The method of claim 1, wherein providing the subscription information to the data service provider comprises:
   providing, to the server, instructions that cause the server to provide the information from the profile in the server as the subscription information to the data service provider.

5. The method of claim 1, wherein providing the subscription information to the data service provider comprises:
   receiving, by the device, authorization input indicative of authorizing provision of the subscription information included in the profile to the data service provider; and
   responsive to receiving the authorization input, providing the information from the profile as the subscription information to the data service provider.

6. The method of claim 1, further comprising:
   receiving, by the device, selection input indicative of a selected service type pertaining to the network provided by the data service provider; and
   responsive to receiving the selection input, providing the selected service type and the information from the profile as the subscription information to the data service provider.

7. The method of claim 1, wherein the device includes an application programming interface configured to communicate with the data service provider based on received instructions from the platform or any other application in the device, wherein providing the subscription information comprises:
   providing, by the platform to the application programming interface, the information from the profile and the instructions that cause the application programming interface to communicate with the data service provider; and
   based on the information and the instructions provided by the platform, providing, by the application programming interface, the information provided by the platform to the data service provider as the subscription information.

8. The method of claim 1, wherein obtaining the configuration package via the first network is based on at least a determination that the configuration package is accessible to the device via the first network,
   and wherein the platform is configured to obtain the configuration package via the second network provided by the data service provider based on at least a determination that the configuration package is accessible to the device via the second network.

9. The method of claim 1, wherein obtaining the configuration package via the first network is based on at least a determination that the memory accessible by the platform does not include the configuration package, and wherein obtaining the configuration package comprises:
   based on at least a determination that the configuration package is included in the memory accessible by the platform, receiving the configuration package from the memory.

10. The method of claim 9, wherein the memory includes a plurality of configuration packages, and wherein receiving the configuration package from the memory comprises:
    determining, by the platform based on information in the request, a particular configuration package of the plurality of configuration packages corresponding to the data service provider; and
    providing the particular configuration package as the configuration package of the data service provider.

11. The method of claim 1, wherein the memory is included in a subscriber identity module (SIM) configured to be removably included in the device such that the memory is accessible by the platform when the SIM is included in the device.

12. A device comprising:
- a network communication interface configured to provide connectivity to a first network, wherein the network communication interface is configured to provide connectivity to a second network provided by a data service provider based on the device being associated with an activated account with the data service provider, and wherein activation of the account with the data service provider authorizes the device to receive subscriber-level connectivity to the second network;
- an input interface configured to receive, during initial setup of the device, based on at least a determination that the device is an unactivated device, input pertaining to a profile including identification information identifying a user of the device;
- one or more processors; and
- data storage configured to store instructions executable by the one or more processors to cause the device to:
  - receive, from a server accessible by the device via the first network, the profile based on the input received at the input interface during the initial setup of the device;
  - determine the data service provider based on configuration instructions included in the data storage;
  - receive a request from the data service provider for subscription information to activate the account with the data service provider, wherein the request is further for the device to obtain a configuration package of the data service provider, and wherein the configuration package includes operating instructions for the device to communicate over the second network;
  - determine that the subscription information is included in the profile;
  - obtain, via the first network, the configuration package;
  - responsive to the determination that the subscription information is included in the profile, provide information from the profile to the data service provider as the subscription information based on the operating instructions in the obtained configuration package; and
  - receive, via the network communication interface, the subscriber-level connectivity to the second network based on the device being associated with the activated account with the data service provider.

13. The device of claim 12, wherein the network communication interface is configured to receive the request for the subscription information from the data service provider based on an account status inquiry provided via the network communication interface to the data service provider.

14. A non-transitory computer readable medium having stored therein instructions, that when executed by a computing device, cause the computing device to perform functions, the functions comprising:
- during initial setup of the computing device, based on at least a determination that the computing device is an unactivated device, receiving, by a platform on the computing device configured to operate the computing device, from a server accessible by the computing device via a first network, a profile including identification information identifying a user of the computing device;
- determining, based on configuration instructions included in a memory accessible by the platform, a data service provider, wherein the computing device is configured to communicate via a second network provided by the data service provider based on the computing device being associated with an activated account with the data service provider, wherein activation of the account with the data service provider authorizes the computing device to receive subscriber-level connectivity to the second network;
- receiving, by the platform, a request from the data service provider for subscription information to activate the account with the data service provider, wherein the request is further for the platform to obtain a configuration package of the data service provider, and wherein the configuration package includes operating instructions for the platform to communicate over the second network;
- determining that the subscription information requested by the data service provider is included in the profile received during the initial setup of the computing device;
- obtaining, by the platform, via the first network, the configuration package;
- responsive to determining that the subscription information is included in the profile received during the initial setup of the device, providing information from the profile to the data service provider as the subscription information; and
- based on the computing device being associated with the activated account with the data service provider, receiving the subscriber-level connectivity to the second network.

15. The non-transitory computer readable medium of claim 14, wherein receiving the profile comprises:
- receiving input indicative of authentication information relating to the profile;
- providing the authentication information to the server; and
- receiving the profile included in the server associated with the authentication information.

* * * * *